US008242441B2

(12) United States Patent
Wouters et al.

(10) Patent No.: US 8,242,441 B2
(45) Date of Patent: Aug. 14, 2012

(54) APPARATUS AND METHODS FOR PNEUMATICALLY-ASSISTED ELECTROSPRAY EMITTER ARRAY

(75) Inventors: Eloy R. Wouters, San Jose, CA (US); Maurizio A. Splendore, Walnut Creek, CA (US); Jean-Jacques Dunyach, San Jose, CA (US)

(73) Assignee: Thermo Finnigan LLC, San Jose, CA (US)

( * ) Notice: Subject to any disclaimer, the term of this patent is extended or adjusted under 35 U.S.C. 154(b) by 427 days.

(21) Appl. No.: 12/642,573

(22) Filed: Dec. 18, 2009

(65) Prior Publication Data

US 2011/0147576 A1 Jun. 23, 2011

(51) Int. Cl.
*B01D 59/44* (2006.01)

(52) U.S. Cl. ........ 250/288; 250/281; 250/282; 250/283; 250/423 R; 250/424; 250/425; 210/198.2; 210/199; 210/200; 210/748.01; 210/656

(58) Field of Classification Search .......... 250/281–283, 250/288, 423 R, 424, 425; 210/198.2, 199, 210/200, 243, 748.01, 656
See application file for complete search history.

(56) References Cited

U.S. PATENT DOCUMENTS

| | | | | |
|---|---|---|---|---|
| 4,861,988 | A | 8/1989 | Henion et al. | |
| 6,245,227 | B1 | 6/2001 | Moon et al. | |
| 6,326,616 | B1 | 12/2001 | Andrien, Jr. et al. | |
| 6,633,031 | B1 | 10/2003 | Schultz et al. | |
| 6,831,274 | B2 * | 12/2004 | Smith et al. | 250/288 |
| 7,232,992 | B2 | 6/2007 | Whitehouse et al. | |
| 2002/0000517 | A1 | 1/2002 | Corso et al. | |
| 2002/0158027 | A1 * | 10/2002 | Moon et al. | 210/756 |
| 2002/0175281 | A1 | 11/2002 | Valaskovic | |
| 2002/0185595 | A1 | 12/2002 | Smith et al. | |
| 2003/0111599 | A1 | 6/2003 | Staats | |
| 2003/0122069 | A1 | 7/2003 | Kato | |

(Continued)

FOREIGN PATENT DOCUMENTS

WO WO 2009/114951 A1 9/2009

OTHER PUBLICATIONS

Kelly et al., "Array of Chemically Etched Fused-Silica Emitters for Improving the Sensitivity and Quantitation of Electrospray Ionization Mass Spectrometry," Anal. Chem. (2007), vol. 79, pp. 4192-4198.

(Continued)

*Primary Examiner* — Jack Berman
*Assistant Examiner* — Meenakshi Sahu
(74) *Attorney, Agent, or Firm* — Thomas F. Cooney

(57) ABSTRACT

An electrospray ion source comprises a source of analyte-bearing liquid; a source of sheath gas; a plurality of liquid conduits, each configured so as to receive a portion of the analyte-bearing liquid; at least one electrode associated with the plurality of liquid conduits for producing electrospray emission of charged droplets from an outlet of each of the liquid conduits; a power supply electrically coupled to the at least one electrode for maintaining the at least one electrodes at an electrical potential; and either one or a plurality of sheath gas conduits, each sheath gas conduit comprising an inlet configured to receive sheath gas and an outlet configured to emit a sheath gas flow that circumferentially surrounds, in at least two dimensions, a portion of the emitted charged droplets.

33 Claims, 14 Drawing Sheets

U.S. PATENT DOCUMENTS

2003/0143493 A1 7/2003 Schultz et al.
2003/0201390 A1 10/2003 Corso et al.
2003/0213918 A1 11/2003 Kameoka et al.
2004/0206910 A1 10/2004 Lee et al.
2004/0227072 A1 11/2004 Park
2005/0054208 A1 3/2005 Fedorov et al.
2006/0103051 A1* 5/2006 Staats ........................ 264/297.2
2006/0113463 A1* 6/2006 Rossier et al. ................ 250/288
2006/0192107 A1 8/2006 DeVoe et al.
2006/0207877 A1 9/2006 Schmidt et al.
2006/0208186 A1 9/2006 Goodley et al.
2006/0249671 A1 11/2006 Karpetsky
2007/0257190 A1* 11/2007 Li ................................ 250/282
2008/0048107 A1 2/2008 McEwen
2008/0067353 A1 3/2008 Li
2009/0056133 A1 3/2009 Waits et al.
2009/0095057 A1 4/2009 Staats
2009/0230296 A1* 9/2009 Kelly et al. ................... 250/281
2011/0192968 A1* 8/2011 Makarov et al. .............. 250/282
2011/0260048 A1* 10/2011 Wouters et al. ............... 250/282
2012/0043460 A1* 2/2012 Wouters et al. ............... 250/282

OTHER PUBLICATIONS

Bruins et al., "Ion Spray Interface for Combined Liquid Chromatography/Atmospheric Pressure Ionization Mass Spectrometry," Anal. Chem. (1987), 59, pp. 2642-2646.

Kelly et al., "Nanoelectrospray Emitter Arrays Providing Interemitter Electric Field Uniformity," Analytical Chemistry (2008), vol. 80, pp. 5660-5665.

* cited by examiner

APPARATUS AND METHODS FOR PNEUMATICALLY-ASSISTED ELECTROSPRAY EMITTER ARRAY

FIELD OF THE INVENTION

The present invention relates to mass spectrometry and mass spectrometers. More particularly, the invention relates to electrospray ion sources for and electrospray ion introduction into mass spectrometers.

BACKGROUND OF THE INVENTION

In electrospray ionization, a liquid is sprayed through the tip of a needle that is held at a high electric potential of a few kilovolts. Small multiply-charged droplets containing solvent molecules and analyte molecules are initially formed and then shrink as the solvent molecules evaporate. The shrinking droplets also undergo fission—possibly multiple times—when the shrinkage causes the charge density of the droplet to increase beyond a certain threshold. This process ends when all that is left of the droplet is a charged analyte ion that can be mass analyzed by a mass spectrometer. Some of the droplets and liberated ions are directed into the vacuum chamber of the mass spectrometer through an ion inlet orifice, such as an ion transfer tube that is heated to help desolvate remaining droplets or ion/solvent clusters. A strong electric field in the tube lens following the ion transfer tube also aids in breaking up solvent clusters. The smaller the initial size of the droplets, the more efficiently they can be desolvated, and eventually, the more sensitive the mass spectrometer system becomes.

One of the design parameters that influence the initial size of the droplets is the size of the emitter orifice through which they are being formed. So-called nanospray ionization is a form of electrospray ionization that employs small-diameter tips in the order of tens of micrometers. This limits the maximum solvent flow rates to the range of tens of microliters to nanoliters per minute. It is well known in the art that, of all the variants of electrospray ionization, nanospray ionization yields the highest current per analyte concentration. This result is attributed to the small bore of the electrospray emitter needles employed, which cause the diameter of the droplets formed at the Taylor cone to be the smallest, such that the combined effects of smaller initial droplet size and higher analyte concentration (as a result of less required solvent) permit a higher proportion of ions to be inlet into a mass spectrometer. Therefore, nanospray ionization enables the most sensitive results to be obtained from a mass spectrometer.

Unfortunately, due to the small-diameter emitter needles employed in nanospray ionization, there is a maximum to the amount of liquid flow that can be accommodated. Therefore, nanospray is limited in its applications to low flow analysis. However, in LC-MS (Liquid Chromatography-Mass Spectrometry) assays, much larger flow rates are encountered, often exceeding 100 microliters per minute and occasionally as high as 5 milliliters per minute. For those flow rates, larger bore needles are conventionally employed and the electrospray variant with pneumatic assist ("sheath" or nebulizing gas) is used to enable shearing off of droplets from the liquid stream as well as to cause subsequent breakdown of the large droplets. The sheath gas may be heated in order to expedite de-solvation. Often, additional auxiliary gas flows (which could be heated) are employed to help the ions escape from the larger solvent droplets.

FIG. 1 illustrates a conventional electrospray system having pneumatic assist, as taught in U.S. Pat. No. 4,861,988 in the names of Henion et al. The instrument system 1 includes an atmospheric pressure ionization chamber 2, a gas curtain chamber 3 and a vacuum chamber 4. The ionization chamber 2 is separated from the gas curtain chamber 3 by an inlet plate 5 containing an inlet orifice 6. The gas curtain chamber 3 is separated from the vacuum chamber 4 by an orifice plate 7 containing an orifice 8. The gas curtain chamber 3 is supplied from a source 11 with a curtain gas (typically nitrogen or argon) at a pressure higher than that prevailing in the ionization chamber 2. In use, the sample to be analyzed is introduced into the ionization chamber 12 and is ionized. The ions are drawn by an electric field through the inlet opening 6, through the orifice 8, and are focused by a lens 9 into a mass spectrometer 10.

Still referring to FIG. 1, liquid from a small-bore liquid chromatograph 12 flows through a thin quartz tube 13 into an "ion spray" device 14. The ion spray device 14 comprises a stainless steel capillary tube 15 of circular cross-section, encircled by an outer tube 16 also of circular cross-section. The inner diameter of the stainless steel capillary tube 15 is typically 0.1 millimeters, and its outer diameter is typically 0.2 millimeters. The inner diameter of the outer tube 16 is typically 0.25 millimeters, leaving an annular space 31 between the two tubes of thickness 0.025 mm. Normally, the tip of the stainless steel tube 15 protrudes slightly from the outer tube 16.

Typically the quartz tube 13 from the liquid chromatograph 12 will be 0.050 mm inner diameter. The tube 13 is sealed at its end 35 to the stainless steel tube 15, so that the liquid flowing in the tube 13 can expand into the stainless steel tube.

A gas, typically nitrogen boiled from liquid nitrogen, is introduced into the space 31 between the tubes 15, 16 from a gas source 17. The gas source 17 is connected to the outer tube 16 by a fitting 18, through which the inner quartz tube 13 passes. Other gases, such as "zero air" (i.e. air with no moisture) or oxygen can also be used.

A source 19 of electric potential is connected to the stainless steel tube 15. For negative ion operation, the stainless steel capillary may be kept at −3000 volts, and for positive ion operation at +3000 volts. The orifice plate 5 is grounded. In operation of the apparatus 1, charged droplets are emitted from the end of the stainless steel tube 15 by electrospray ionization at the same time that the gas flows through the space 31 surrounding the stainless steel tube 15. The combination of the electric field and the gas flow serves to nebulize the liquid stream. The nebulizer gas flow through the annular space 31 also allows a larger distance to be maintained between the tip of the stainless steel tube 15 and the orifice plate 5 than in the case when no gas is used, thus helping to reduce the electric field at the tip of the tube and prevent corona discharge.

Various designs have been proposed in an attempt to extend the benefits of small initial droplets—as are associated with low flow rates, for example, nanospray—to the larger flow rates required for LC-MS analysis. The concept is to use multiple low-flow rate emitters in parallel so as to divide the large flow into a large number of smaller flows, each directed to a single emitter. An example of an apparatus that employs this strategy is shown in FIG. 2, in which is illustrated an array of fused-silica capillary nano-electrospray ionization emitters arranged in a circular geometry, as taught in United States Patent Application Publication 2009/0230296 A1, in the names of Kelly et al. Each nano-electrospray ionization emitter 21 comprises a fused silica capillary having a tapered tip 22. As taught in United States Patent Application Publication 2009/0230296 A1, the tapered tips can be formed either by traditional pulling techniques or by chemical etching and the radial arrays can be fabricated by passing approximately 6 cm lengths of fused silica capillaries through holes in one or more discs 20. The holes in the disc or discs may be placed at the desired radial distance and inter-emitter spacing and two such discs can be separated to cause the capillaries to run parallel to one another at the tips of the nano-electrospray ionization emitters and the portions leading thereto. Analogous benefits have been described by Smith and coworkers in U.S. Pat. No. 6,831,274 (combination of multiple electrosprayers with an ion funnel).

An issue with having a multitude of nanospray emitters is that the generated cloud of droplets starts to have dimensions that become incompatible with those of the inlet orifice of the mass spectrometer, in other words only a fraction of the mist generated is actually drawn into the inlet of the mass analyzer. This loss obviously results in decreased sensitivity of the instrument. Some possible remedies to this problem could be to provide larger or additional inlets to the mass spectrometer, but that in turn causes a larger (or more) vacuum pump(s) to be required to maintain similar pressures in the mass spectrometer. This leads to additional costs, spatial requirements, shipping weight etc. all of which are not beneficial.

In considering emitter arrays, it is desirable to be able to balance the desirable effects of small low-flow-rate emitters against the possible undesirable effects of a large number of emitters. In order to divide the total flow from a conventional liquid chromatograph among several emitters interfaced to a conventional mass spectrometer ion inlet, the distance between the individual emitters should be maintained as small as possible. However, it is also known in the art that, in order for a Taylor cone to be formed, a high electric field gradient is required. Commonly, this is obtained by having a high aspect ratio structure such as a needle. Yet, when there are multiple needles in close proximity, the spray from one needle could be negatively impacted by the electric field around a neighboring needle. Also, when multiple emitters abut one another, because of the surface tension, the eluent from the different channels could coalesce rather than form individual Taylor cones. All such issues could be resolved by using a limited number of emitters—such that the flow rate per emitter is in the range of hundreds of microliters to a few milliliters per minute—in conjunction with pneumatic assist techniques.

Arrays of electrospray emitters in close proximity to one another are known in the art. Microfabrication techniques that have been borrowed from the electronics industry and micro-electromechanical systems (MEMS), such as chemical vapor deposition, molecular beam epitaxy, photolithography, chemical etching, dry etching (reactive ion etching and deep reactive ion etching), molding, laser ablation, etc., have been used to fabricate such emitter arrays. For instance, FIGS. 3A-3B show, respectively, a schematic view of one electrospray system and a cross-sectional view of an electrospray device of the system, as taught in United States Patent Application Publication 2002/0158027 A1, in the names of Moon et al. The individual electrospray device 204, which may comprise one member of an array of such devices, generally comprises a silicon substrate or microchip or wafer 205 defining a channel 206 through substrate 205 between an entrance orifice 207 on an injection surface 208 and a nozzle 209 on an ejection surface 210. The nozzle 209 has an inner and an outer diameter and is defined by a recessed region 211. The region 211 is recessed from the ejection surface 210, extends outwardly from the nozzle 209 and may be annular. The tip of the nozzle 209 does not extend beyond the ejection surface 210 to thereby protect the nozzle 209 from accidental breakage.

A grid-plane region 212 of the ejection surface 210 is exterior to the nozzle 209 and to the recessed region 211 and may provide a surface on which a layer of conductive material 214 including a conductive electrode 215 may be formed for the application of an electric potential to the substrate 205 to modify the electric field pattern between the ejection surface 210, including the nozzle tip 209, and the extracting electrode 217. Alternatively, the conductive electrode may be provided on the injection surface 208 (not shown).

The electrospray device 204 further comprises a layer of silicon dioxide 213 over the surfaces of the substrate 205 through which the electrode 215 is in contact with the substrate 205 either on the ejection surface 210 or on the injection surface 208. The silicon dioxide 213 formed on the walls of the channel 206 electrically isolates a fluid therein from the silicon substrate 205 and thus allows for the independent application and sustenance of different electrical potentials to the fluid in the channel 206 and to the silicon substrate 205. Alternatively, the substrate 205 can be controlled to the same electrical potential as the fluid.

As shown in FIG. 3A, to generate an electrospray, fluid may be delivered to the entrance orifice 207 of the electrospray device 204 by, for example, a capillary 216 or micropipette. The fluid is subjected to a electrical potential $V_{fluid}$ via a wire (not shown) positioned in the capillary 216 or in the channel 206 or via an electrode (not shown) provided on the injection surface 208 and isolated from the surrounding surface region and the substrate 205. An electrical potential $V_{substrate}$ may also be applied to the electrode 204 on the grid-plane 212, the magnitude of which is preferably adjustable for optimization of the electrospray characteristics. The fluid flows through the channel 206 and exits or is ejected from the nozzle 209 in the form of very fine, highly charged fluidic droplets 218. The extracting electrode 217 may be held at an electrical potential $V_{extract}$ such that the electrospray is drawn toward the extracting electrode 217 under the influence of an electric field.

Almost all microfabricated electrospray nozzles or other emitters have no provision for delivery of a nebulizing gas directly to the nozzle or emitter. One apparatus that is an exception to this statement is disclosed in United States Patent Application Publication 2006/0113463 A1 in the names of Rossier et al., as is illustrated in FIG. 4. The apparatus 23 illustrated in FIG. 4 is made in a substrate 24 and comprises two covered microstructures, namely a sample microchannel 25 and a sheath liquid microchannel 26 that are connected to inlet reservoirs 27, 28 respectively, placed on the same side of the support 24 for fluid introduction. The microstructures have an outlet 29 formed at the edge of the support, at which the spray is to be generated upon voltage application.

As described in the aforementioned United States Patent Application Publication 2006/0113463 A1, the apparatus 23 comprises two plasma etched microchips made of a polyimide foil having a thickness of 75 μm, comprising one microchannel (approximately 60 μm×120 μm×1 cm) sealed by lamination of a 38 μm thick polyethylene/polyethylene terephthalate layer and one gold microelectrode (not illustrated) of approximately 52 μm diameter integrated at the bottom of the microchannel. The two polyimide chips are glued together and further mechanically cut in a tip shape, in such a manner that this multilayer system exhibits two microstructures both comprising a microchannel having an outlet at the edge of the polyimide layers, thereby forming an apparatus such that the outlets of the sample and sheath liquid microstructures are superposed. The thickness of the support separating the two microstructure outlets may be less than 50 micrometers.

In operation of the apparatus 23, when an electrical potential is applied to the electrode, a Taylor cone is formed that encompasses the outlets 29 of both the sample and sheath liquid microchannels, so that the sample solution mixes with the sheath liquid solution directly in the Taylor cone. Rossier et al. further teach that, instead of a sheath liquid, a sheath gas may be introduced into the micro-channel 26. This gas may be an inert gas such as nitrogen, argon, helium or the like, serving e.g. to favor the spray generation and/or to prevent the formation of droplets at the microstructure outlet. For some applications, a reactive gas such as oxygen or a mixture of inert and reactive gases may also be used so as to generate a reaction with the sample solution. Rossier et al. further teach that an array of such apparatuses can be constructed.

Likewise, United States Patent Application Publication US 2007/0257190 A1, in the name of inventor Li, teaches microfluidic chip structures for gas assisted ionization, these structures having an analyte channel ending in a spray tip and having up to four gas channels having outlet ends adjacent to the spray tip. For instance, Li teaches an apparatus having a spray tip having a first pair of gas channels having ends disposed at opposite sides of the spray tip and a second pair of gas channels, provided by auxiliary gas chips, also disposed at opposite ends of the spray tip.

Although the apparatuses taught by Rossier et al. and by Li appear to operate adequately, they only provide for introduction of a sheath gas at a finite number of discrete gas channel ends adjacent to a fluid channel. The nebulizing gas provided by these finite numbers of discrete gas channels thus does not exit the channels in a fashion that two-dimensionally circumferentially surrounds the fluid emitted from the fluid channel. As a result, these apparatuses are subject to potential asymmetry or non-uniformity in the sheath pressure or flow rate around the emitted droplets or other charged particles. For instance, if the sheath or nebulizing gas is supplied via a single channel aperture on one side of the Taylor cone, the supplied gas flow may not symmetrically surround the stream of emitted droplets. If the gas is supplied from multiple channels, then restricted flow or clogging in one or more of the channels may cause similar difficulties. Since sheath gas is supplied under pressure, the introduction of sheath gas in such an asymmetric or non-uniform fashion in such existing apparatuses, if not carefully controlled, may perturb the emission pattern and direction of electrospray droplets in a manner that causes fluctuations in the ability of ions to be captured by an ion inlet port of a mass spectrometer. Further, since the outlets of both the sample and sheath liquid or gas microchannels, as described in the Rossier et al. apparatus, must fit within the dimensions of an individual Taylor cone, this apparatus is limited to nanospray flow regimes and is not suitable for providing variable flow rates in the range of hundreds of microliters to a few milliliters per minute, as would be expected when dividing a total sample flow of an LC-MS among a limited number of emitters.

SUMMARY OF THE INVENTION

We herein disclose novel electrospray ion sources and methods that take all of the above issues into consideration. The conventional single electrospray emitter within a single concentric sheath gas flow tube is replaced with a plurality of electrospray assemblies, each of which carries a fraction of the total flow of analyte-bearing liquid and that receives pneumatic assistance from circumferentially surrounding sheath gas flow. As non limiting examples, the number of these electrospray emitters can be as low as 2 or 3, and can easily be envisioned to be 15 or even higher.

In a first aspect of the invention, there is disclosed an electrospray ion source for a mass spectrometer comprising: a source of an analyte-bearing liquid; a source of a sheath gas; a plurality of liquid conduits, each liquid conduit configured so as to receive a portion of the analyte-bearing liquid from the source of analyte-bearing liquid; at least one electrode for producing electrospray emission of charged droplets from an outlet of each of said liquid conduits under application of an electrical potential to the at least one electrode; a power supply electrically coupled to the at least one electrode for maintaining the at least one electrode at the electrical potential; and a plurality of sheath gas conduits, each sheath gas conduit comprising: an inlet configured to receive a sheath gas portion from the source of sheath gas; and an outlet configured to emit a sheath gas flow that circumferentially surrounds, in at least two dimensions, a portion of the charged droplets emitted from a respective one of the liquid conduit outlets.

In a second aspect of the invention, there is disclosed an electrospray ion source for a mass spectrometer comprising: a source of an analyte-bearing liquid; a source of a sheath gas; a plurality of liquid conduits, each liquid conduit configured so as to receive a portion of the analyte-bearing liquid from the source of analyte-bearing liquid; at least one electrode for producing electrospray emission of charged droplets from an outlet of each of said liquid conduits under application of an electrical potential to the at least one electrode; a power supply electrically coupled to the at least one electrode for maintaining the at least one electrode at the electrical potential; and a sheath gas conduit comprising: an inlet configured to receive the sheath gas from the source of sheath gas; and an outlet configured to emit a sheath gas flow that circumferentially surrounds, in at least two dimensions, a portion of the charged droplets emitted from every one of the plurality of liquid conduit outlets.

In another aspect the invention, a method for providing ions to a mass spectrometer is disclosed, the method comprising: providing a source of an analyte-bearing liquid; providing a source of a sheath gas; providing a plurality of liquid conduits, each liquid conduit configured so as to receive a portion of the analyte-bearing liquid from the source of analyte-bearing liquid; providing at least one electrode associated with the plurality of liquid conduits; providing a plurality of sheath gas conduits, each sheath gas conduit comprising a sheath gas outlet configured to emit a sheath gas flow that circumferentially surrounds, in at least two dimensions, an outlet of a respective one of the liquid conduits; distributing the analyte-bearing liquid among the plurality of liquid conduits; distributing the sheath gas among the plurality of sheath gas conduits; and maintaining the at least one electrode at an electrical potential such that charged liquid droplets are emitted from the plurality of liquid conduits.

In yet another aspect of the invention, a method for providing ions to a mass spectrometer is disclosed, the method comprising: providing a source of an analyte-bearing liquid; providing a source of a sheath gas; providing a plurality of liquid conduits, each liquid conduit configured so as to receive a portion of the analyte-bearing liquid from the source of analyte-bearing liquid and having a respective outlet; providing at least one electrode associated with the plurality of liquid conduits; providing a sheath gas conduit comprising a sheath gas outlet configured to emit a sheath gas flow that circumferentially surrounds, in at least two dimensions, the outlets of the plurality of liquid conduit outlets; distributing the analyte-bearing liquid among the plurality of liquid conduits; providing the sheath gas to the sheath gas conduit; and maintaining the at least one electrode at an electrical potential such that charged liquid droplets are emitted from the plurality of liquid conduits.

In accordance with the present teachings, the diameters of each of a plurality of electrospray emitting capillaries may be smaller than is the case for a conventional single capillary. Such smaller capillaries can generate smaller initial droplets which are more readily de-solvated. Further, the smaller capillary size enables all of the electrospray emitters to be in close proximity to one another so that ions are directed to an ion inlet of a mass spectrometer. Although the emitters are in close mutual proximity, nonetheless, they are each surrounded by nebulizing sheath such that their individual Taylor cones are not perturbed and also coalescence of liquid from different sprayers does not occur. In various embodiments, each liquid capillary or conduit may be configured so as to admit a flow rate of an analyte-bearing liquid portion of between 1 microliter per minute and 1 milliliter per minute through the capillary or conduit. The total flow rate, summed over all capillaries or conduits, may range from approximately 10 microliters per minute up to approximately 10 milliliters per minute.

BRIEF DESCRIPTION OF THE DRAWINGS

The above noted and various other aspects of the present invention will become apparent from the following description which is given by way of example only and with reference to the accompanying drawings, not drawn to scale, in which.

DETAILED DESCRIPTION

The present invention provides methods and apparatus for an improved ionization source for mass spectrometry. The following description is presented to enable one of ordinary skill in the art to make and use the invention and is provided in the context of a particular application and its requirements. It will be clear from this description that the invention is not limited to the illustrated examples but that the invention also includes a variety of modifications and embodiments thereto. Therefore the present description should be seen as illustrative and not limiting. While the invention is susceptible of various modifications and alternative constructions, it should be understood that there is no intention to limit the invention to the specific forms disclosed. On the contrary, the invention is to cover all modifications, alternative constructions, and equivalents falling within the essence and scope of the invention as defined in the claims. To more particularly describe the features of the present invention, please refer to the attached FIGS. 5-14 in conjunction with the discussion below.

Figure 5:
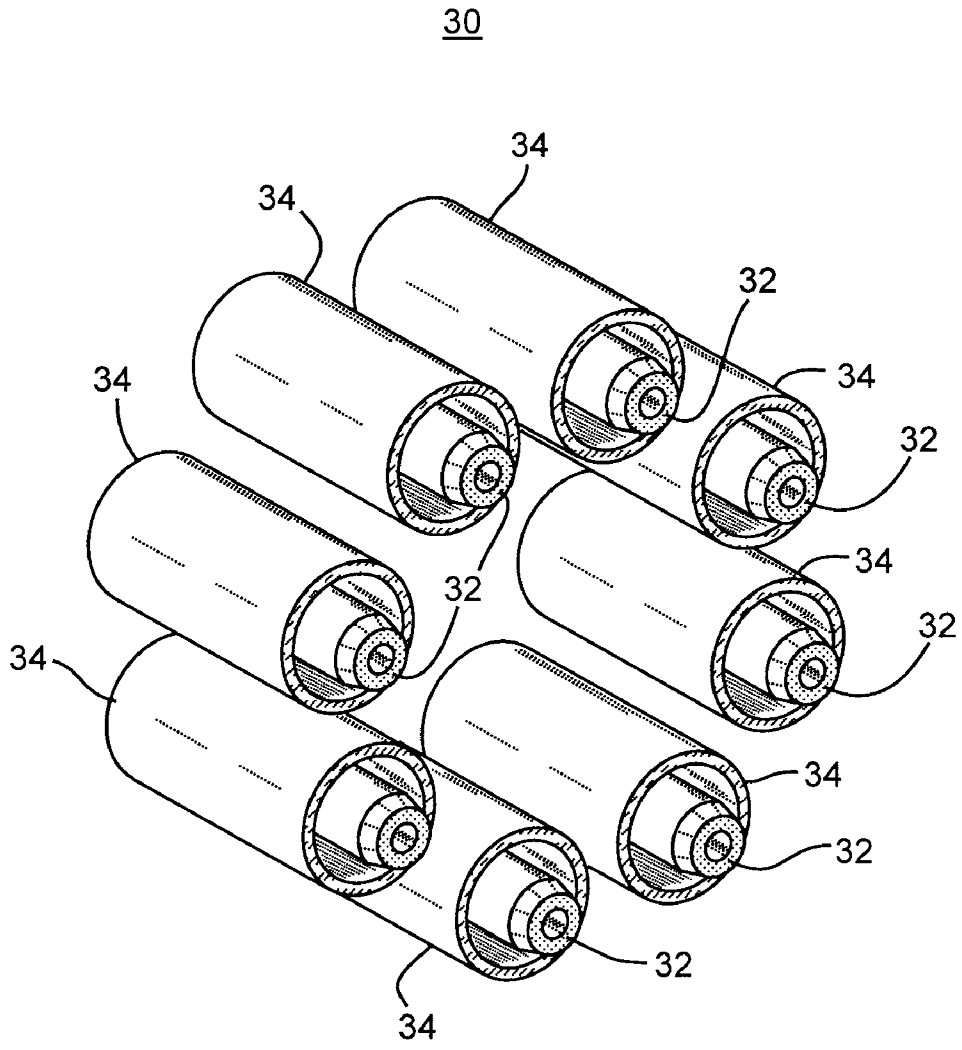
FIG. 5 is a schematic illustration of an array of electrospray capillary emitters, each emitter having a respective enclosing tube providing sheath gas to the emitter, in accordance with the invention.

FIG. 5 is a schematic illustration of an apparatus comprising an array of electrospray capillary emitters in accordance with the invention. Each electrospray emitter capillary 32 of the electrospray emitter array apparatus 30 (FIG. 5) is enclosed within the hollow inner bore of a respective tube 34 which supplies a sheath or nebulizing gas to the vicinity of the respective emitter capillary tip. The inner diameter of each tube 34 is greater than the outer diameter of each respectively enclosed electrospray emitter capillary 32 thus creating a gap through which the sheath or nebulizing gas is able to flow. The cross-sectional area of the gap may be maintained constant, among the various tubes 34, so as to maintain a constant gas shearing force applied to liquid streams or jets emitted from the various capillaries 32. Further, the total cross-sectional area of the plurality of gaps (or total gas flow rate through all the gaps) could be maintained equal to or approximately to the cross sectional area of (or gas flow rate associated with) a single sheath gas delivery system of a conventional pneumatically assisted electrospray apparatus.

Analyte-bearing liquid is delivered to each respective capillary tip through an interior bore of the respective capillary 32. Preferably, each capillary tip protrudes outward slightly relative to the end of the respective enclosing tube. In a similar fashion, each tube 34 delivers a sheath or nebulizing gas to vicinity of a respective emitter capillary tip. Thus, each capillary 32 may be considered as a particular example of a liquid conduit through which the analyte-bearing liquid flows and each tube 34 may be considered as a particular example of a sheath gas conduit through which the sheath or nebulizing gas flows. Clearly, other forms of liquid conduit and sheath gas conduit may be employed, some of which are specifically discussed in regard to subsequent examples provided later in this document.

Still referring to FIG. 5, all or a portion of the emitter capillaries 32 may be electrically conductive so that an electrical potential may be applied to the analyte-bearing liquid (using not-illustrated electrical leads) so as to give rise to electrospray emission from each tip. For instance, the capillaries may be fabricated from a conductive material, such as stainless steel. Alternatively, if the material of which the capillaries are made is not itself conductive (e.g., silica capillaries), then an electrically conductive coating, such as a gold coating, may be applied to portions of the capillaries, such as the capillary tips. As another alternative, electrodes may penetrate into the capillary interiors. As yet another alternative, a liquid junction or union positioned upstream from the emitter tips (such as a junction between a liquid delivery tube and an inlet to one or more capillaries) may be provided with a conductive material that serves as an electrode. In the latter alternative, a single electrode at the liquid junction may be used to apply a common electric potential to analyte-bearing liquid within more than one emitter capillary. The enclosing tubes 34 are generally fabricated of a non-electrically-conductive material, such as silica glass or a synthetic polymer.

Figure 1:
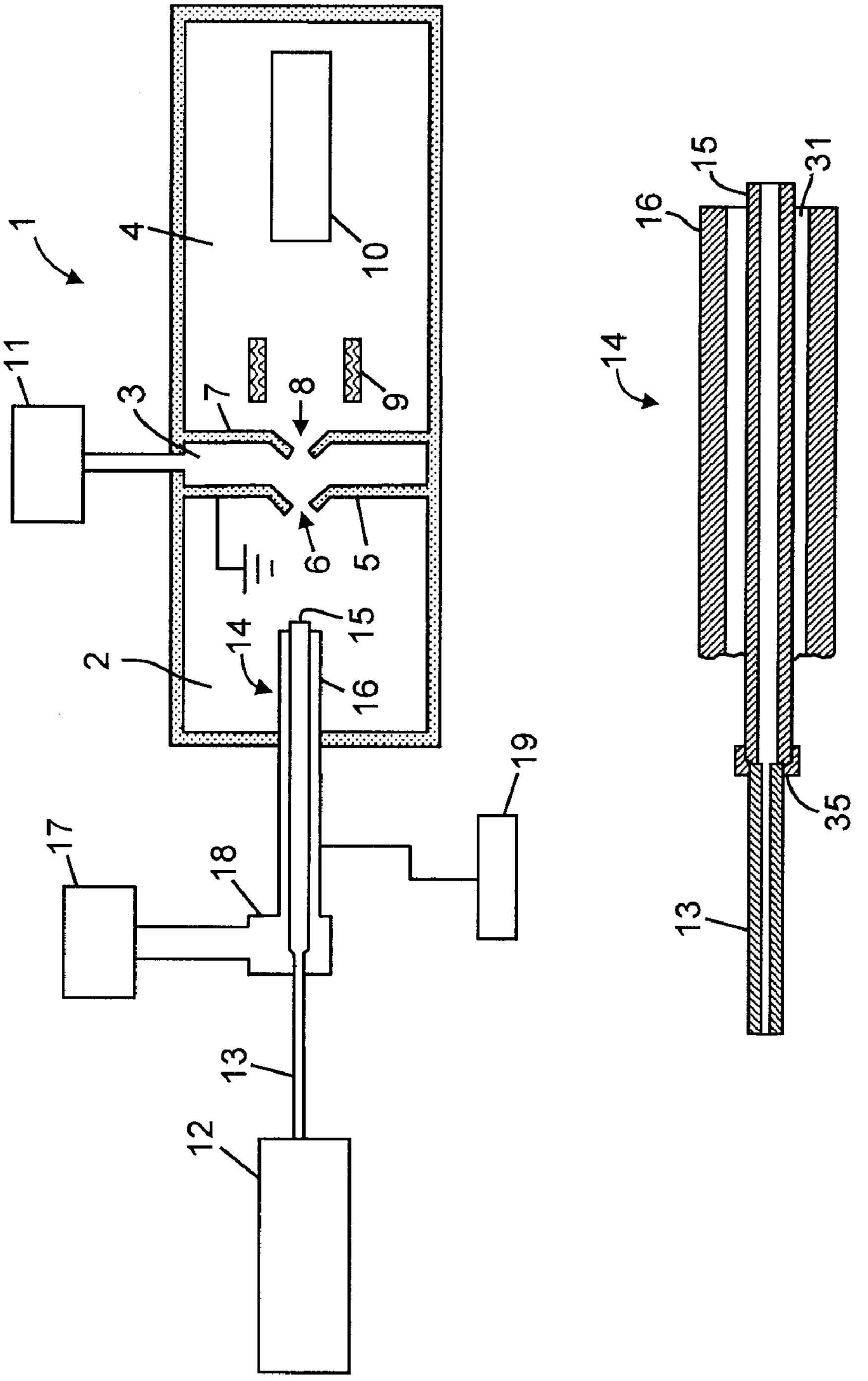
FIG. 1 (Prior Art)
FIG. 1 is a schematic illustration of a conventional electrospray system using pneumatic assistance.
Figure 2:
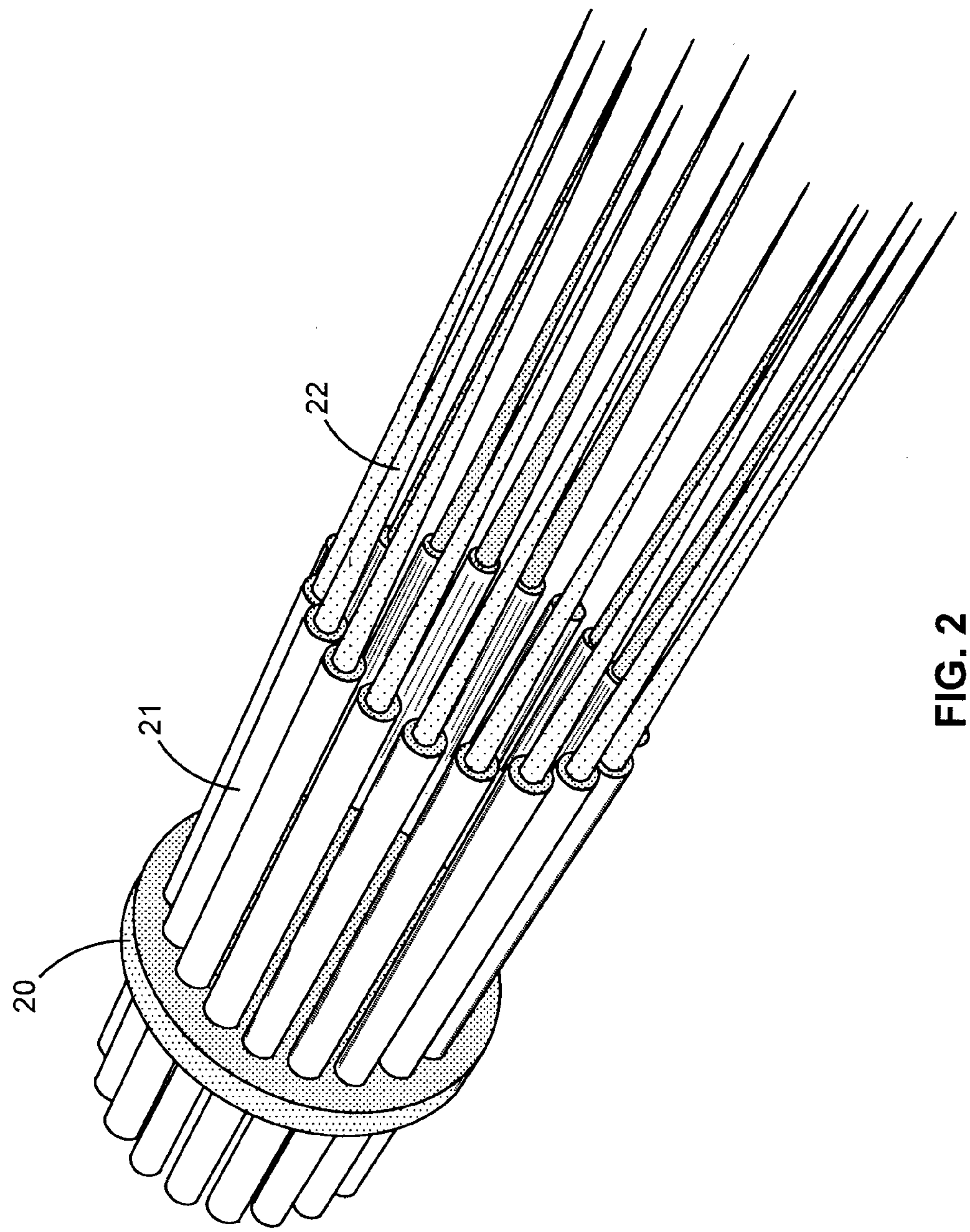
FIG. 2 (Prior Art)
FIG. 2 is an illustration of a known array of fused-silica capillary nano-electrospray ionization emitters.
Figure 3A:
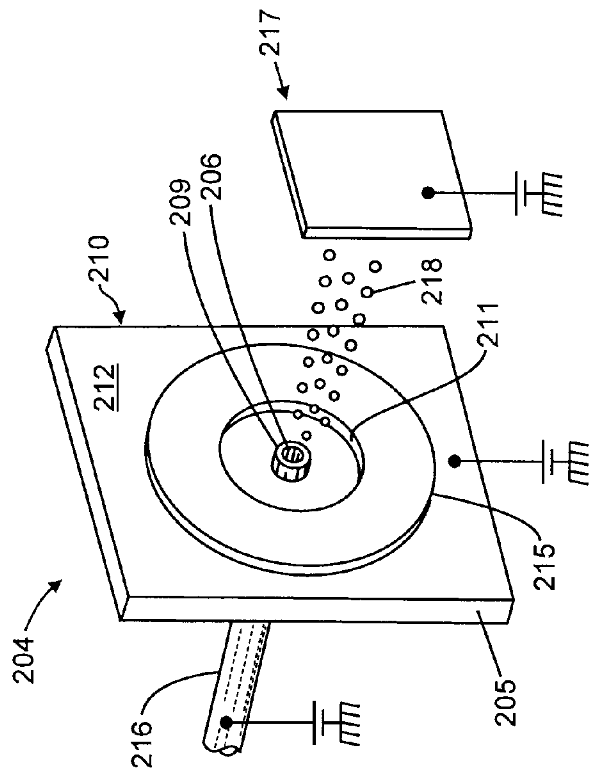
FIG. 3A (Prior Art)
FIGS. 3A-3B show, respectively, a schematic view of a conventional microfabricated electrospray system and a cross-sectional view of a microfabricated electrospray device of the system.
Figure 3B:
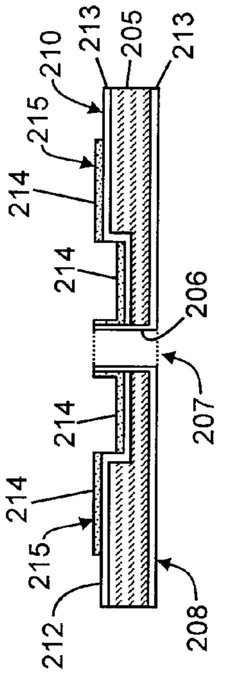
FIG. 3B (Prior Art)
Figure 4:
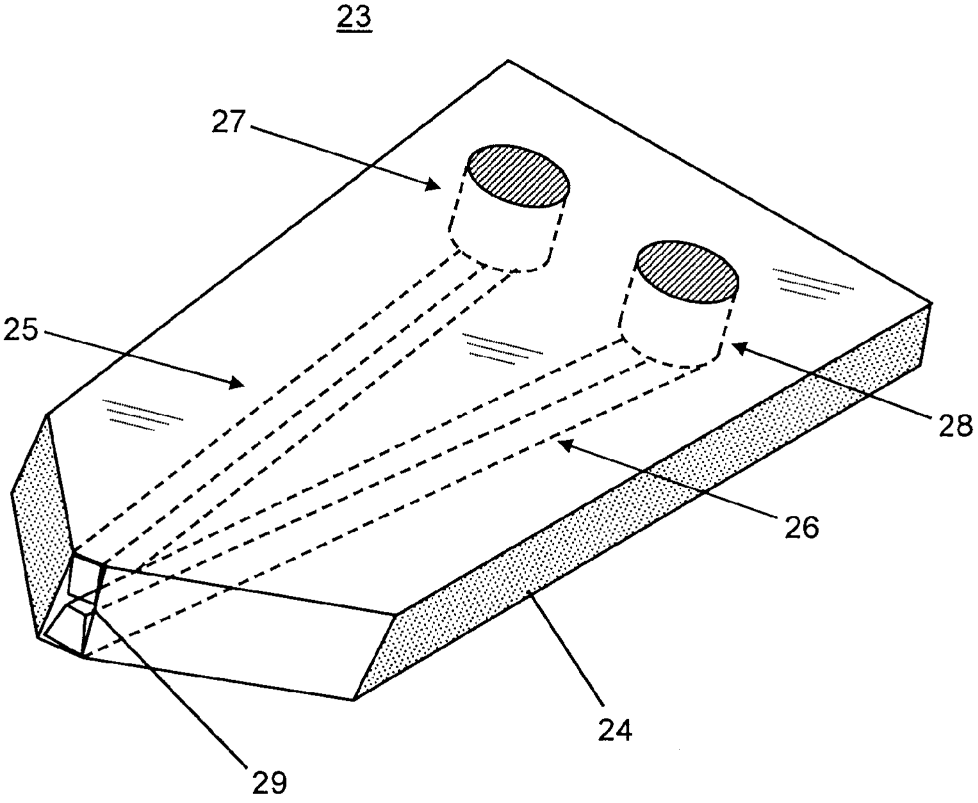
FIG. 4 (Prior Art)
FIG. 4 is an illustration of a known microfabricated electrospray nozzle having separate micro-channels for respective conveyance of a sample and a sheath liquid or gas to the nozzle.

As envisaged, the flow of an analyte-bearing liquid is divided approximately equally among the electrospray emitter capillaries 32 comprising the array. Therefore, according to the configuration shown in FIG. 5, the flow through each electrospray emitter capillary 32 comprises approximately one-eighth of the total flow. With such reduced flow rate, the ionized droplets that are sprayed from each emitter capillary are smaller and more readily evaporated than would be the case for droplets sprayed from a single capillary carrying the total flow. Further, since the droplets sprayed from each capillary are circumferentially surrounded by sheath gas flowing out of a respective enclosing tube, droplet separation and evaporation are further enhanced, relative to the single capillary case. Although eight such capillary and tube pairs are illustrated in FIG. 3, the apparatus is not considered to be limited to any particular number of such capillary and tube pairs or to the circular configuration shown.

Figure 6:
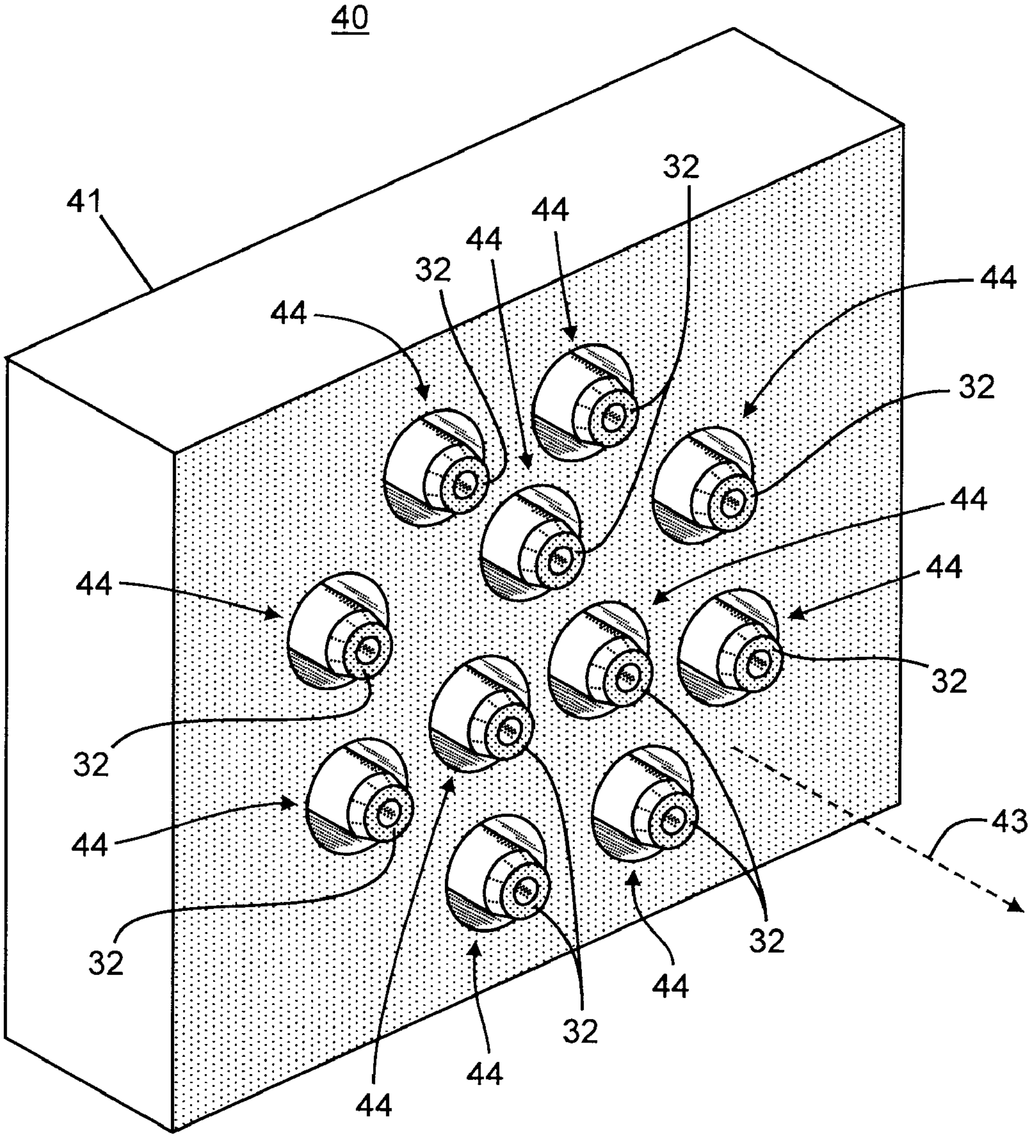
FIG. 6 is a schematic illustration of an array of electrospray capillary emitters housed in a block such that each emitter has a respective enclosing conduit through the block providing sheath gas to the emitter, in accordance with the invention.

FIG. 6 is a schematic illustration of an array of electrospray capillary emitters housed in a block such that each emitter has a respective enclosing conduit through the block providing sheath gas to the emitter, in accordance with the invention. In the electrospray emitter array apparatus 40 shown in FIG. 6, the separate tubes shown in FIG. 5 are replaced by a housing block 41 through which a plurality of channels 44 pass. Each channel 44 may enclose a respective electrospray emitter capillary 32 having an outer diameter that is less than the inner diameter of the channel, thus creating a gap through which the sheath or nebulizing gas is able to flow. The cross-sectional area of the gap may be maintained constant, among the various channels 44, so as to maintain a constant gas shearing force applied to liquid streams or jets emitted from the various capillaries 32. Further, the total cross-sectional area of the plurality of gaps (or total gas flow rate through all the gaps) could be maintained equal to or approximately to the cross sectional area of (or gas flow rate associated with) a single sheath gas delivery system of a conventional pneumatically assisted electrospray apparatus.

Twelve channel and emitter capillary pairs are illustrated in FIG. 6. However, the apparatus is not considered to be limited to any particular number of such channel and capillary pairs or to the particular configuration of channels and capillaries shown. As previously described, an electric potential may be applied to the analyte-bearing liquid within the capillaries by any one of several methods.

In the apparatus shown FIG. 6, the channels and capillaries are shown as being aligned parallel to common axis 43. However, not all channels and capillaries need to be provided in such a parallel arrangement. In alternative embodiments, the channels 44, the enclosed emitter capillaries 32, or both the channels and capillaries may be angled inwardly in the direction of the axis 43 or in the direction of an ion inlet aperture of a mass spectrometer (not shown) so as to limit outward spreading of the plume of emitted droplets and thereby "focus" or provide spatial confinement of the plume of droplets so as to increase the tendency of the droplets or ions produced therefrom to enter the ion inlet aperture. Such angled or non-parallel emitter capillaries or sheath gas channels or conduits may also be optionally provided in electrospray emitter apparatuses shown in other figures of this document.

Figure 7:
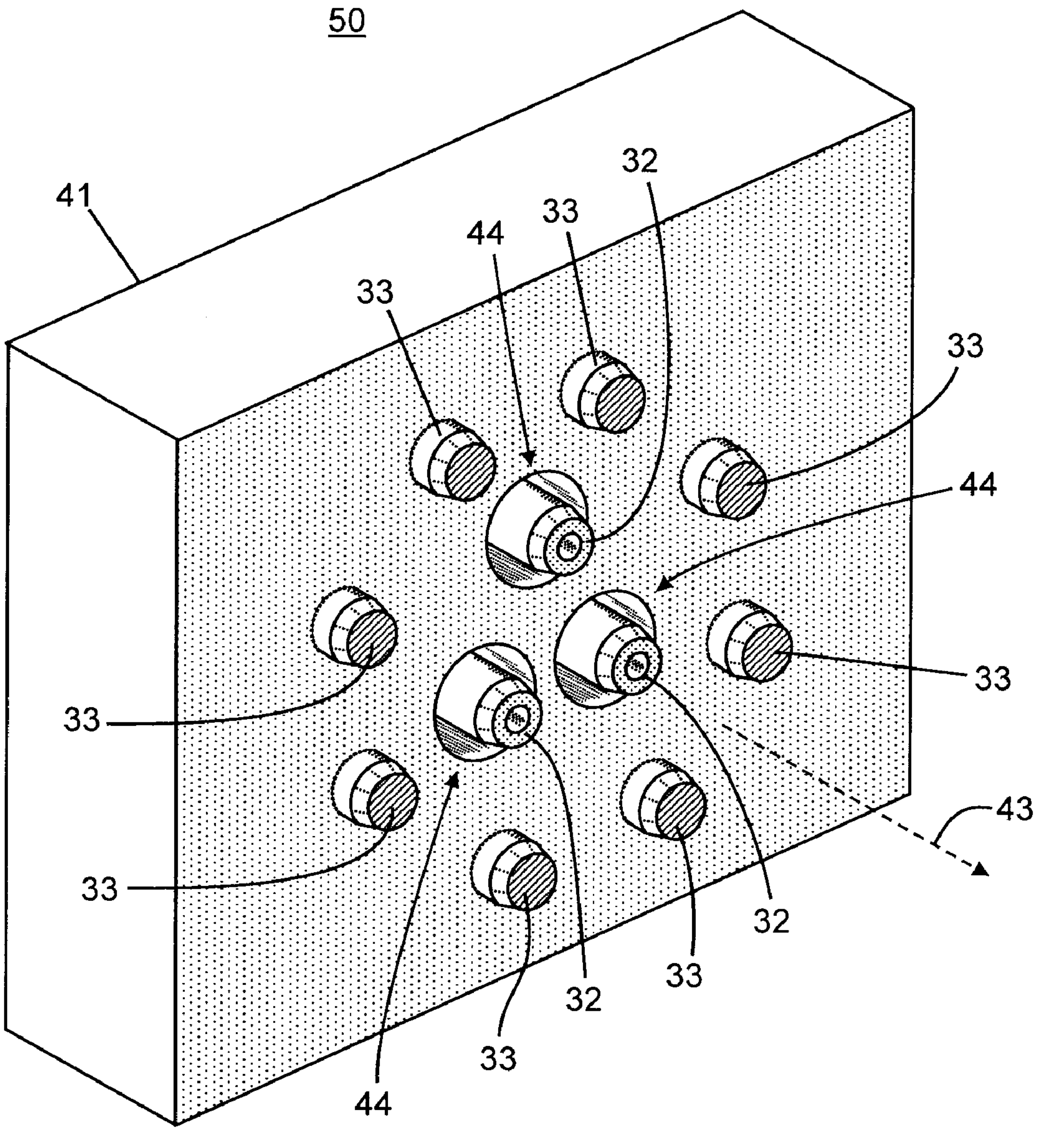
FIG. 7 is a schematic illustration of an array of electrospray capillary emitters and surrounding non-emitting electrodes housed in a block, each emitter having a respective enclosing conduit through the block providing sheath gas to the emitter, in accordance with the invention.

The electrospray emitter array apparatus 50 shown in FIG. 7 is a variation of the apparatus 40 of FIG. 6 in which a number of outer electrodes 33 passing through the housing block 41 are configured so as to surround the array of electrospray emitter capillaries 32. The outer electrodes may, in fact, simply comprise additional capillaries through which fluid flow is not provided. The outer electrodes 33 may be provided within additional sheath-gas carrying channels 44 in a fashion similar to the manner in which the electrospray emitter capillaries 32 are enclosed within the channels 44. The surrounding outer electrodes 33 may be maintained at an electrical potential which is the same as or similar to the electrical potential of the electrospray emitter capillaries 32. The inventors have observed that, in the absence of such additional electrodes 33, the spray plumes from the outermost emitters of the emitter array propagate outwardly, away from the central axis 43, as a result of curving of the electric field lines at the outer boundaries of the emitter array. The provision of the additional electrodes 33 permits the electric field to remain more uniform, than would otherwise be the case, across all electrospray emitter capillaries 32. In this situation, spray emission is confined more closely to the vicinity of the axis 43. As previously described, the electrospray emitter capillaries 32 may be angled inwardly towards the axis 43.

Figure 8:
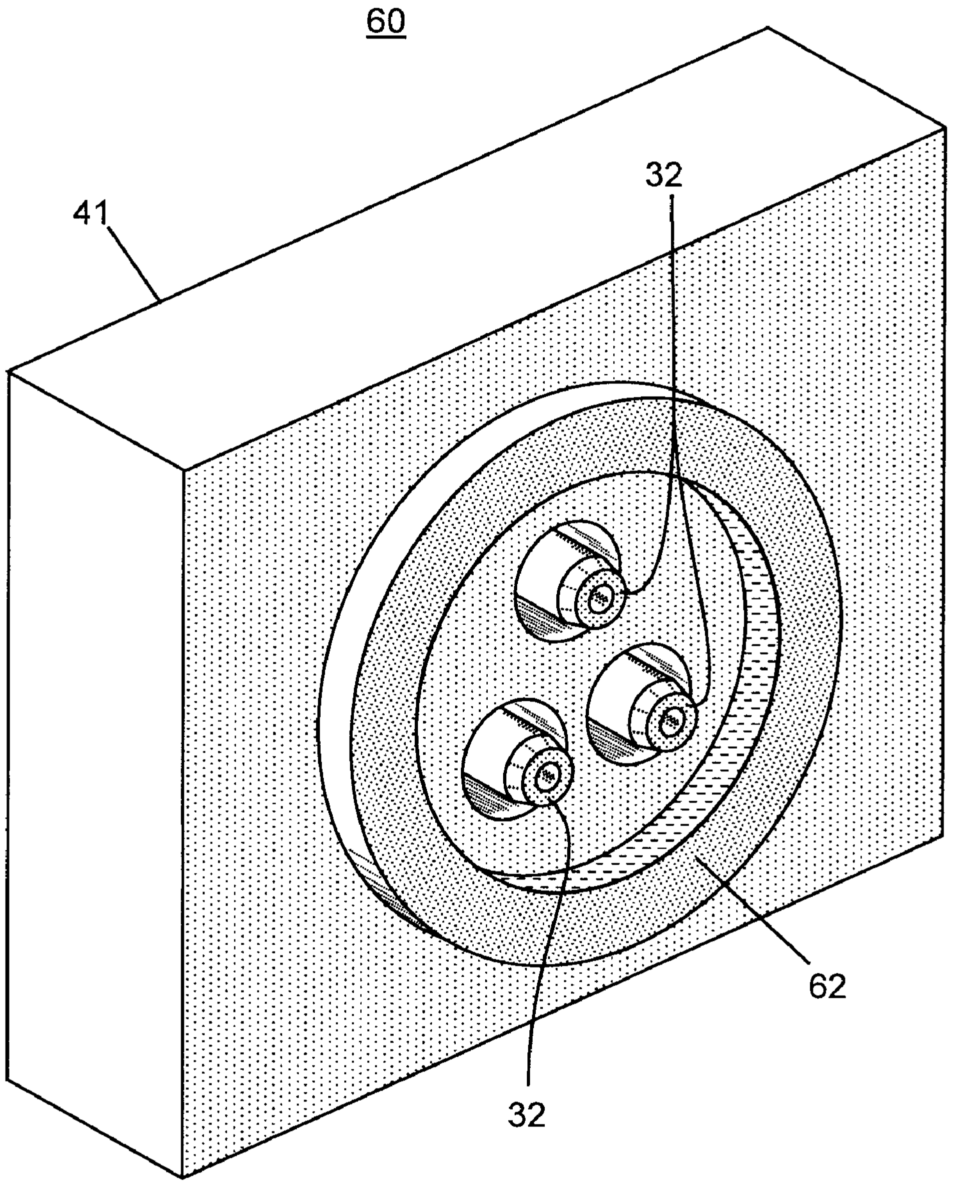
FIG. 8 is a schematic illustration of an array of electrospray capillary emitters housed in a block, each emitter having a respective enclosing conduit through the block providing sheath gas to the emitter and the array of emitters surrounded by a ring electrode, in accordance with the invention.

The electrospray emitter array apparatus 60 shown in FIG. 8 represents a further modification of the apparatus of FIG. 7. In the electrospray emitter array apparatus 60, the additional outer electrodes are replaced by a single ring electrode 62 surrounding the electrospray emitter capillaries 32, each passing through a respective sheath-gas carrying channel. Only three such electrospray emitter capillaries 32 are shown in FIGS. 7-8 for purposes of ease of illustration. In fact, these apparatuses are not restricted to any particular number of electrospray emitter capillaries.

Figure 9:
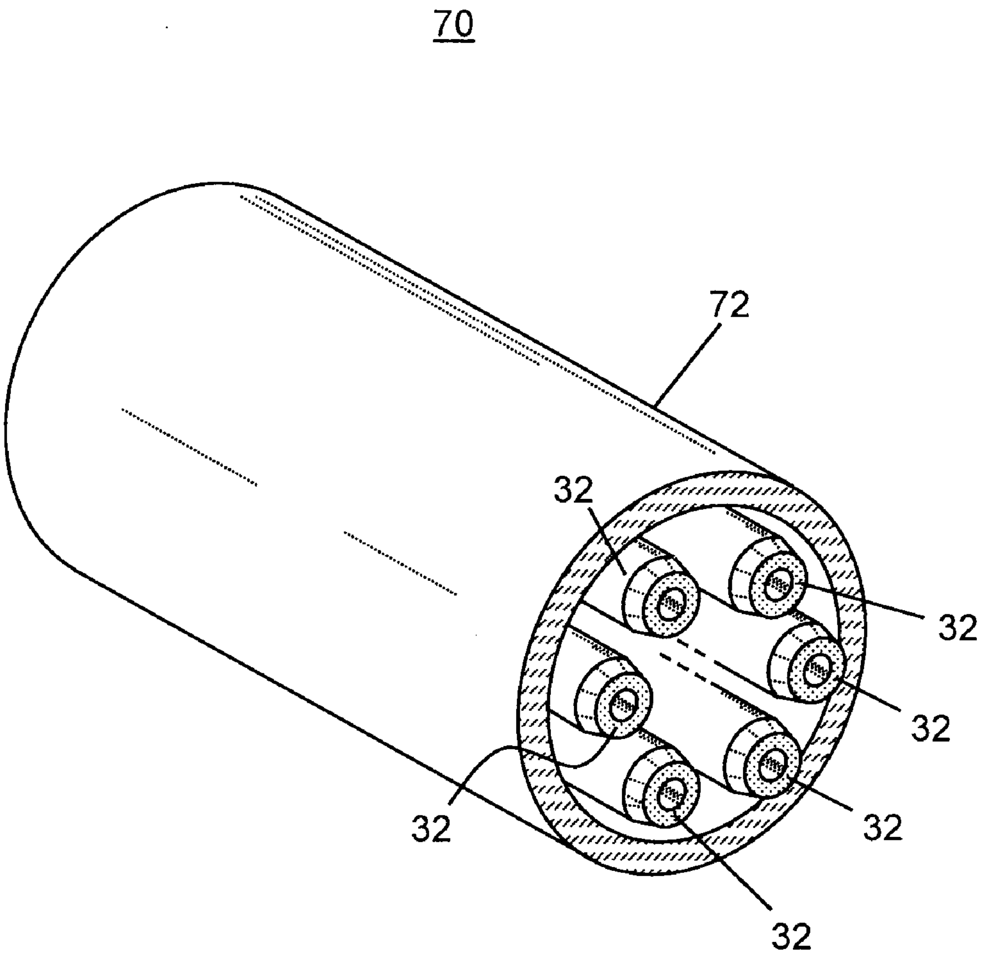
FIG. 9 is a schematic illustration of an array of electrospray capillary emitters all enclosed within a single tube providing sheath gas to the emitters, in accordance with the invention.
Figure 10:
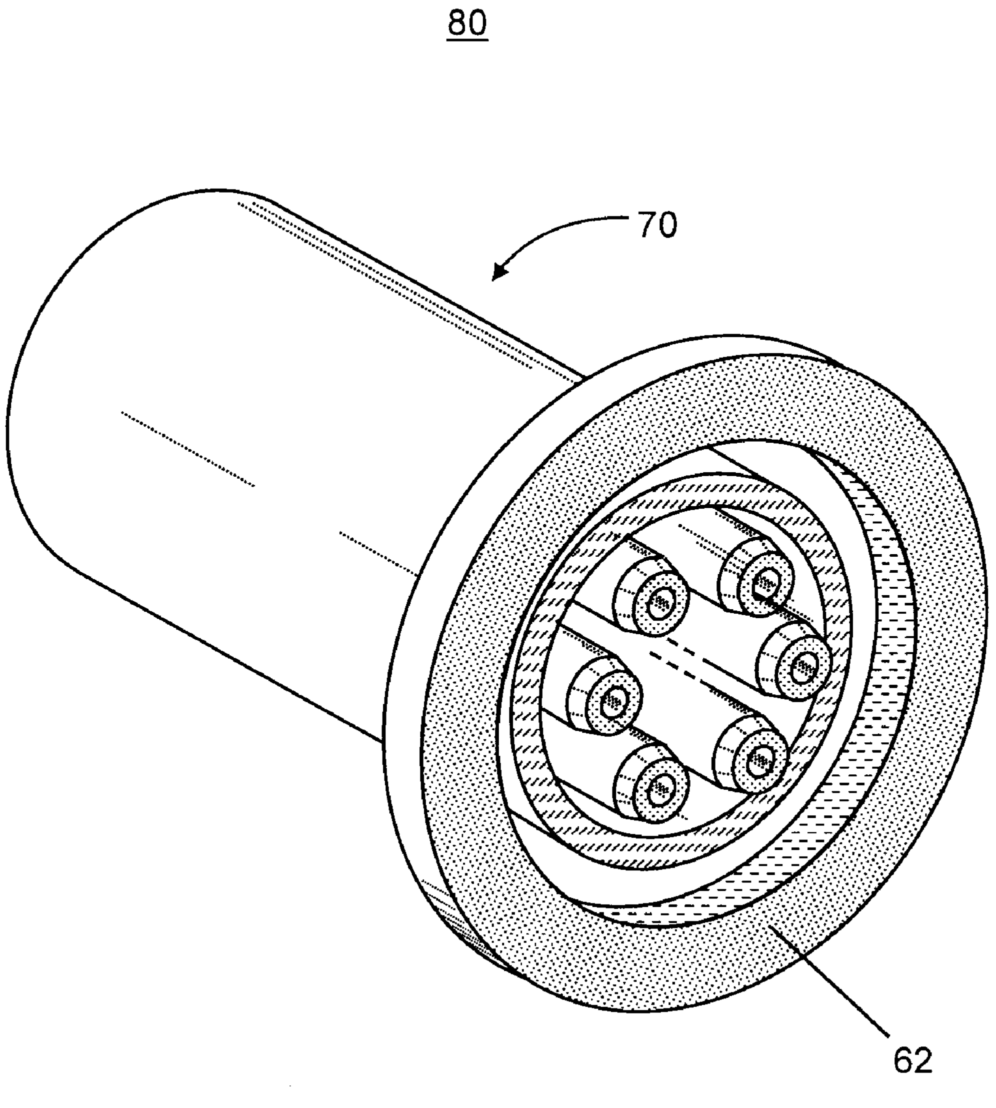
FIG. 10 is a schematic illustration of an array of electrospray capillary emitters all enclosed within a single tube providing sheath gas to the emitters, the array of emitters surrounded by a ring electrode, in accordance with the invention.

FIG. 9 is a schematic illustration of an electrospray emitter array apparatus 70 which is otherwise similar to the apparatus 30 of FIG. 5 except that, in the apparatus 70 (FIG. 9), all electrospray emitter capillaries 32 are enclosed within a single tube 72 providing sheath gas to circumferentially surround the electrospray emission of all of the electrospray emitter capillaries. The inner diameter of the tube 72 is sufficiently large so that a plurality of electrospray emitter capillaries 32 may be disposed within the tube without contacting either one another or the inner surface of the tube in the vicinity of the end of the tube. Such a configuration permits sheath flow gas to flow around and circumferentially surround each emitter capillary so as to envelop the electrospray emissions of all of the emitter capillaries. The apparatus 80 shown in FIG. 10 includes the same electrospray emitter array apparatus 70 and also includes a ring electrode 62 which aids in the electrostatic confinement of the sprayed droplets to the vicinity of a longitudinal axis, extended, of the gas-carrying tube, as previously described.

Figure 11:
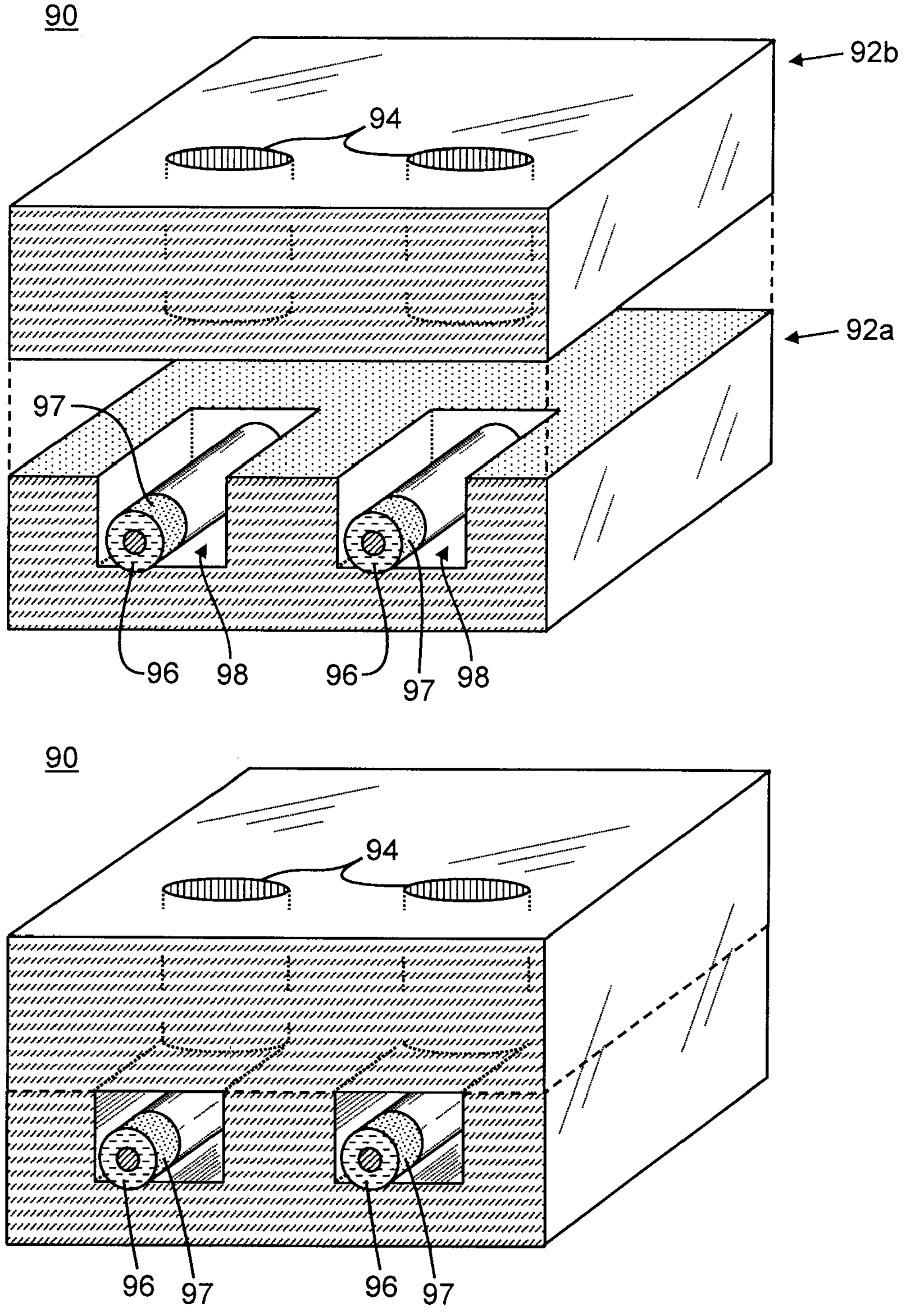
FIG. 11 is a schematic illustration of an array of electrospray capillary emitters housed in a two-piece block such that each emitter has a respective enclosing conduit through the block providing sheath gas to the emitter, in accordance with the invention.

FIG. 11 is a schematic illustration of a micro-fabricated array 90 of electrospray capillary emitters in accordance with the invention. The apparatus 90 comprises a first block 92*a* comprising electrospray a plurality of nozzles 96, each such nozzle surrounded by a respective recess 98 in the first block 92*a*. The apparatus 90 further comprises a second block 92*b* comprising gas channels 94 passing at least partly through the block and open on at least one face of the block. The two blocks as well their structural features—the nozzles 96, recesses 98 and gas channels 94—may be formed by as wholly integrated units by, for instance, injection molding or other micro-fabrication or micro-machining techniques. Electrodes 97 may be deposited or adhered on respective nozzles, for instance as a metal film or metal foil, so that an electrical potential may be applied to the nozzle tips, by means of a power supply and electrical leads (not shown) so as to initiate electrospray emission from each nozzle. Alternatively, an electric potential may be applied to the analyte-bearing liquid within the capillaries, so as to initiate electrospray, by any one of several other methods, as described previously herein.

As shown in the bottom half of FIG. 11, the full apparatus may be assembled by bonding together the first and second blocks 92*a*, 92*b* such that the channels 94 align with portions of the recesses 98. In operation, the hollow nozzles 96 receive an analyte bearing liquid from, for instance, a liquid chromatograph, via liquid channels (not shown) in the first block 92*a* and, possibly via external liquid transfer lines (not shown). In operation, the gas channels 94 receive a sheath gas from a gas source (not shown) such that the sheath gas flows out of that apparatus by means of the several recesses 98 circumferentially surrounding the nozzles. By this means, electrospray emissions from the nozzles are assisted by the circumferentially surrounding flow of sheath gas emanating from the recesses 98. The recesses 98 may comprise circular cross sections or be of any other suitable shape.

Figure 12:
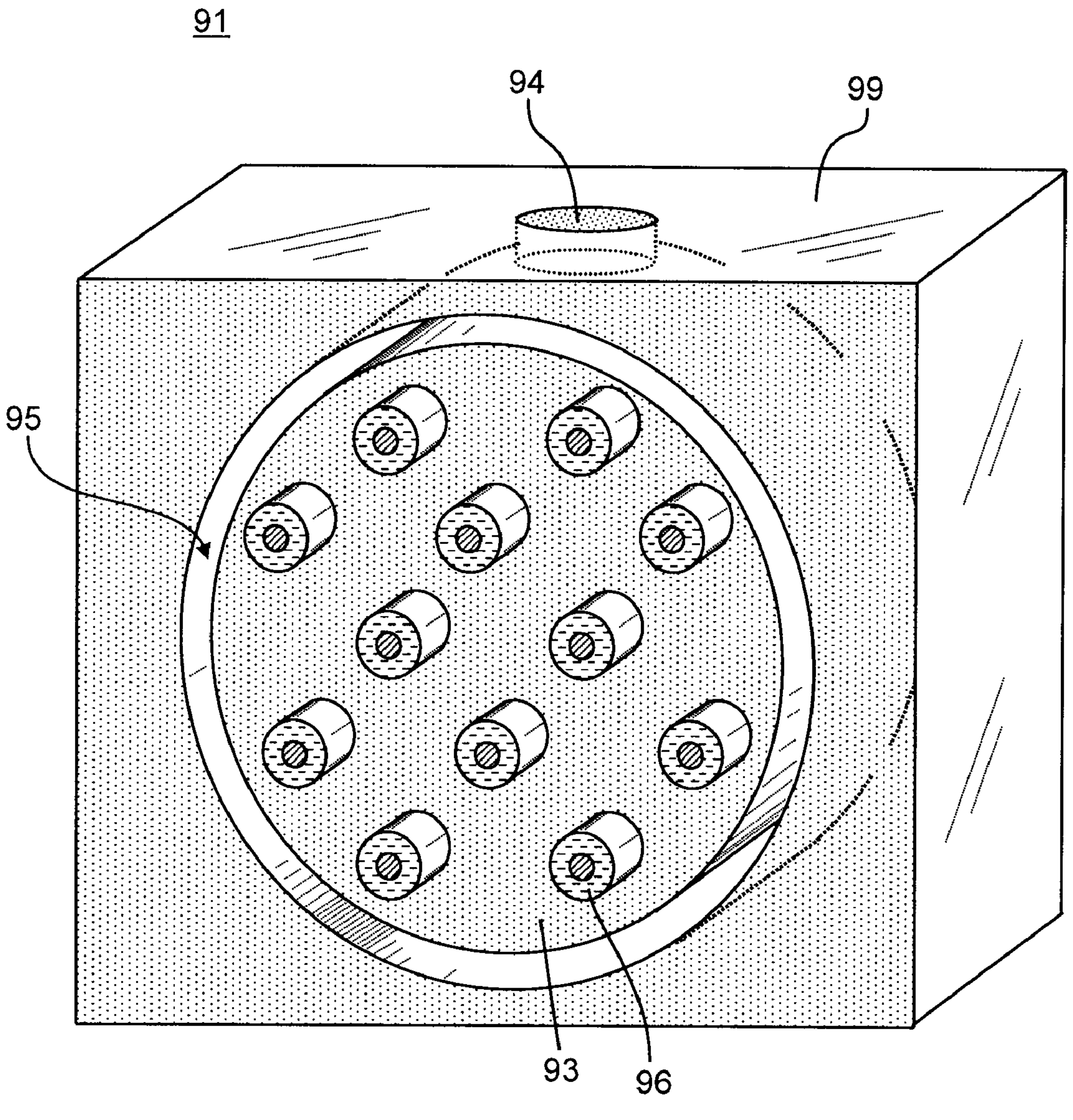
FIG. 12 is a schematic illustration of an array of electrospray capillary emitters housed in a block such that the array of emitters has a single enclosing conduit through the block providing sheath gas to the array of emitters, in accordance with the invention.

The apparatus 91 shown in FIG. 12 is a variation of the previously illustrated apparatus from which the sheath gas is emitted, not by a plurality of recesses (as in the apparatus 90 of FIG. 11) but, instead, from a single groove 95 that is open in at least one end in the housing block 99. The open end of the groove 95 is formed such that outward flow of sheath gas, supplied to the groove 95 from gas channel 94, circumferentially surrounds the electrospray emission from the plurality of nozzles 96. The nozzles 96 protrude from or are disposed within or on a central plug 93 that is separated from the main body of the housing block 99 by the groove 95. The plug 93 may comprise a separate piece relative to the housing block 99 or, if the groove 95 does not extend all the way through to the back end (as presented in FIG. 12) of the housing block 99, may be integral with the housing block. The apparatus 91 may be fabricated by injection molding or other micro-fabrication or micro-machining techniques.

Figure 13:
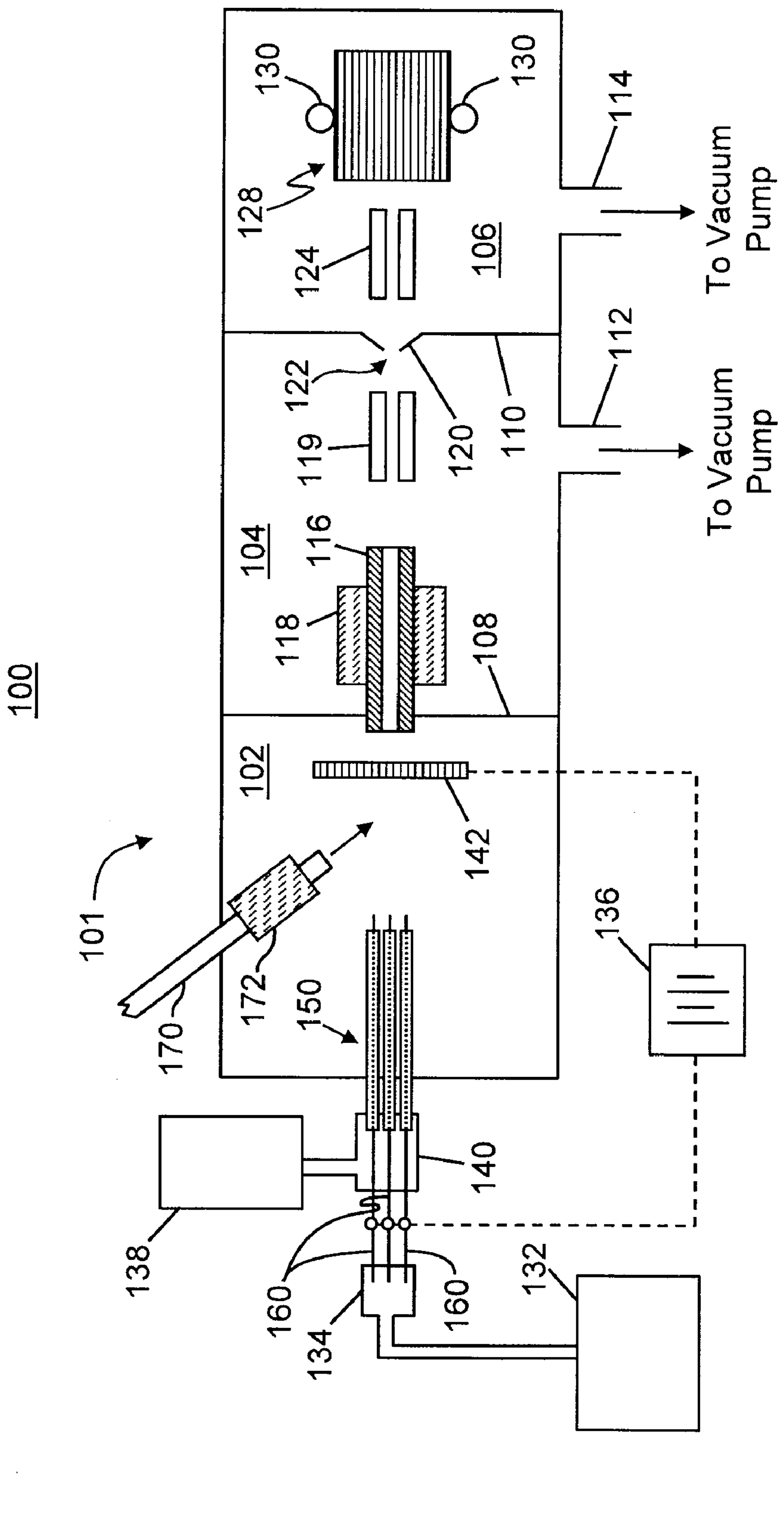
FIG. 13 is a schematic illustration of a mass spectrometer system employing a first electrospray emitter array in accordance with the invention.

FIG. 13 is a simplified schematic diagram of a mass spectrometer system 100, in accordance with the invention, comprising an electrospray emitter array ion source coupled to an analyzing region via an ion transfer tube. Referring to FIG. 13, ionization chamber 102 receives a liquid sample from an associated apparatus 132 such as for instance a liquid chromatograph or syringe pump. The electrospray emitter array 150 forms charged particles representative of the sample, which are subsequently transported from the to the mass analyzer 128 in high-vacuum chamber 106 through at least one intermediate-vacuum chamber 104. In particular, the droplets or ions are entrained in a sheath gas and transported from the electrospray emitter array 150 through an ion transfer tube 116 that passes through a first partition element or wall 108 into an intermediate-vacuum chamber 104 which is maintained at a lower pressure than the pressure of the ionization chamber 102 but at a higher pressure than the pressure of the high-vacuum chamber 106. The ion transfer tube 116 may be physically coupled to a heating element or block 118 that provides heat to the gas and entrained particles in the ion transfer tube so as to aid in desolvation of charged droplets so as to thereby release free ions.

A plate or second partition element or wall 110 separates the intermediate-vacuum chamber 104 from either the high-vacuum chamber 106 or possibly a second intermediate-pressure region (not shown), which is maintained at a pressure that is lower than that of chamber 104 but higher than that of high-vacuum chamber 106. Ion optical assembly or ion lens 119 provides an electric field that guides and focuses the ion stream leaving ion transfer tube 116 through an aperture 122 in the second partition element or wall 110 that may be an aperture of a skimmer 120. A second ion optical assembly or lens 124 may be provided so as to transfer or guide ions to the mass analyzer 128. The ion optical assemblies or lenses 119, 124 may comprise transfer elements, such as, for instance a multipole ion guide, so as to direct the ions through aperture 122 and into the mass analyzer 128. The mass analyzer 128 comprises one or more detectors 130 whose output can be displayed as a mass spectrum. Vacuum port 112 is used for evacuation of the intermediate-vacuum chamber and vacuum port 114 is used for evacuation of the high-vacuum chamber 106.

The mass spectrometer system 100 shown in FIG. 13, comprises an electrospray emitter array apparatus 150 in which the spray from each emitter is circumferentially surrounded by a respective sheath gas aperture, channel space or groove, as in the apparatus 30 (FIG. 5), the apparatus 40 (FIG. 6), the apparatus 50 (FIG. 7) the apparatus 60 (FIG. 8) or the apparatus 90 (FIG. 11). The gas is introduced from a gas source 138 that is connected gas channels or spaces of the electrospray emitter array apparatus 150 by a gas-distributing fitting 140 that distributes the sheath gas among the plurality of gas channels or spaces surrounding the emitters. Each liquid flow channel or capillary of the apparatus 150 receives an analyte-bearing liquid from a respective liquid transfer line 160. The analyte-bearing liquid is supplied from an associated apparatus 132, such as a liquid chromatograph that delivers the liquid to a liquid-distributing fitting 134 that distributes the liquid among the plurality of liquid transfer lines 160. An optional auxiliary gas tube 170 may provide a flow of auxiliary gas into the ionization chamber 102 in order to further assist in solvent evaporation from charged droplets. The auxiliary gas may be heated by a heater 172.

A power supply 136 electrically connected to emitter electrodes of the emitter array apparatus 150 as well as to a counter electrode 142 so as to create a voltage difference and, thus, an electric field between the emitters and the counter electrode that serves to separate positively charged from negatively charged ions in the liquid and to cause ions of a desired polarity to be emitted in the direction of the ion transfer tube 116. The ion transfer tube 116 may itself be electrically connected to power supply 136 and used as a counter electrode. In such a case, a separate counter electrode may not be required. To capture positively charged analyte ions, the emitter electrode or electrodes are held at a positive potential, relative to the counter electrode (or the ion capillary) which may be held at ground potential. Alternatively, the emitter electrode or electrodes may be grounded and the counter electrode maintained at a negative potential. These polarities are reversed in case to capture negative ions.

Figure 14:
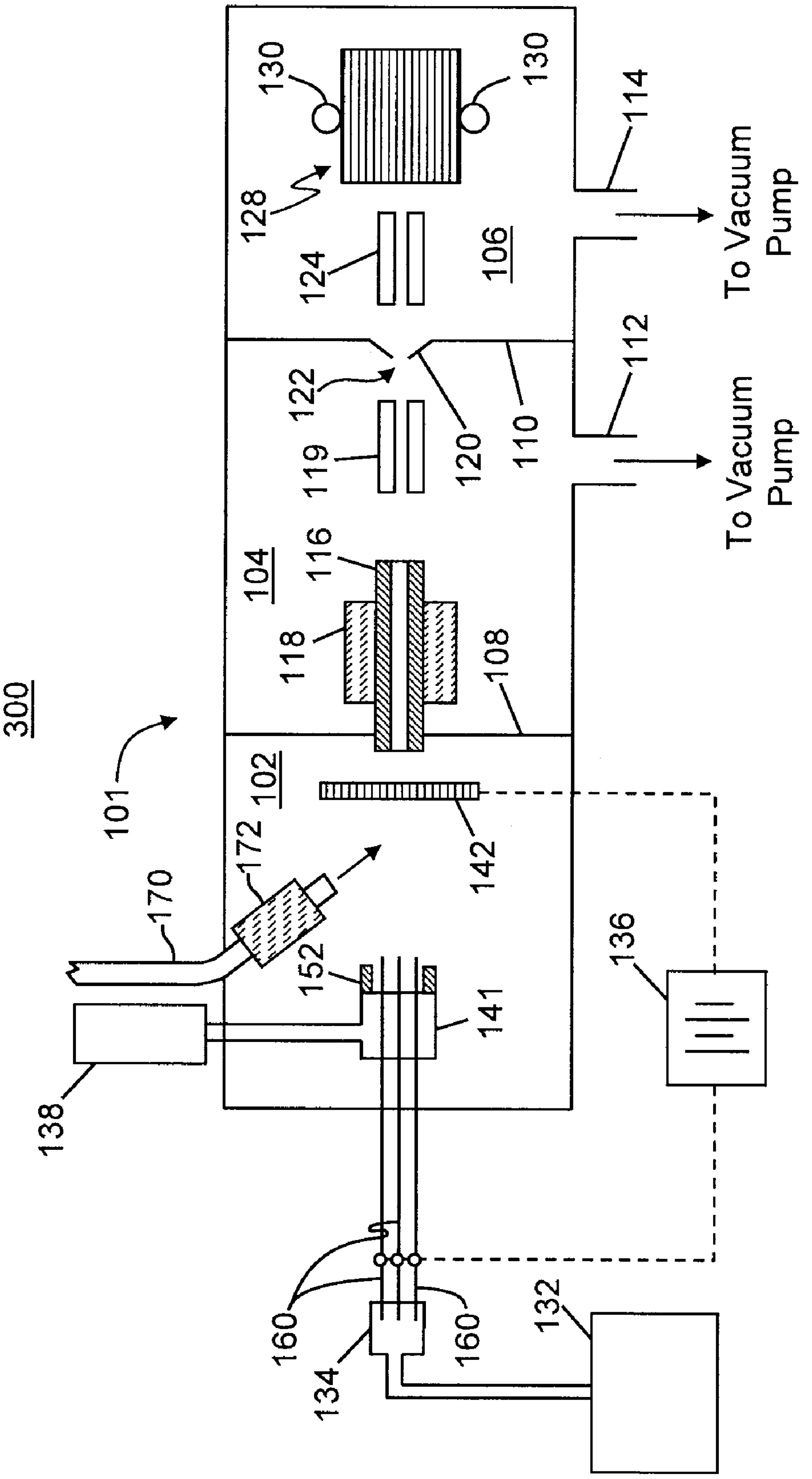
FIG. 14 is a schematic illustration of a mass spectrometer system employing a second electrospray emitter array in accordance with the invention.

The mass spectrometer system 300 shown in FIG. 14, comprises an electrospray emitter array apparatus 152 in which each a single sheath gas aperture, channel space or groove circumferentially surrounds the spray from a plurality of emitters as in the apparatus 70 (FIG. 9), the apparatus 80 (FIG. 10), or the apparatus 91 (FIG. 12). The system 300 is similar to the system 100 shown in FIG. 13 except that the system 300 comprises a gas fitting 141 that is directly fluidically coupled to the single sheath gas aperture, channel space or groove of the emitter array apparatus 152. For instance, the gas fitting 141 may be directly fluidically coupled to single tube 72 shown in FIG. 9 or to the channel 94 shown in FIG. 12.

The discussion included in this application is intended to serve as a basic description. Although the present invention has been described in accordance with the various embodiments shown and described, one of ordinary skill in the art will readily recognize that there could be variations to the embodiments and those variations would be within the spirit and scope of the present invention. The reader should be aware that the specific discussion may not explicitly describe all embodiments possible; many alternatives are implicit. Accordingly, many modifications may be made by one of ordinary skill in the art without departing from the spirit, scope and essence of the invention. As one non-limiting example, the additional electrodes described in reference to the electrospray emitter array apparatus 50 (FIG. 7) or the electrospray emitter array apparatus 60 (FIG. 8) could be incorporated into other not-illustrated embodiments or into apparatuses exhibited in other drawings, such as the micro-fabricated electrospray capillary emitter array 90 (FIG. 11) or the micro-fabricated electrospray capillary emitter array 91 (FIG. 12). Likewise, the angular or non-parallel disposition of either emitter capillaries or sheath gas channels or conduits described in reference to FIG. 6 may also be optionally provided in electrospray emitter apparatuses shown in other figures of this document. For instance, the interior surfaces of groove 95 shown in block 99 of FIG. 12 could be formed as frustoconical surfaces such that flowing sheath gas is directed inwardly towards an axis or an aperture of a mass spectrometer, or in some other fashion. Alternatively, the walls of sheath gas channels, capillaries or conduits could be beveled at the outlets of such channels, capillaries or conduits so as to focus sheath gas flow or to direct it in some other fashion.

Neither the description nor the terminology is intended to limit the scope of the invention. Any publications, patents or patent application publications mentioned in this specification are explicitly incorporated by reference in their respective entirety.

What is claimed is:

1. An electrospray ion source for a mass spectrometer comprising:
- a source of an analyte-bearing liquid;
- a source of a sheath gas;
- a plurality of liquid conduits, each liquid conduit configured so as to receive a portion of the analyte-bearing liquid from the source of analyte-bearing liquid;
- at least one electrode for producing electrospray emission of charged droplets from an outlet of each of said liquid conduits under application of an electrical potential to the at least one electrode;
- a power supply electrically coupled to the at least one electrode for maintaining the at least one electrode at the electrical potential; and
- a plurality of sheath gas conduits, each sheath gas conduit comprising:
  - an inlet configured to receive a sheath gas portion from the source of sheath gas; and
  - an outlet configured to emit a sheath gas flow that circumferentially surrounds, in at least two dimensions, a portion of the charged droplets emitted from a respective one of the liquid conduit outlets.

2. An electrospray ion source as in claim 1, wherein each sheath gas conduit comprises a tube that at least partially encloses a respective one of the liquid conduits.

3. An electrospray ion source as in claim 1, wherein each liquid conduit comprises a capillary.

4. An electrospray ion source as in claim 1, wherein the at least one electrode comprises a plurality of electrodes, each electrode of the plurality of electrodes associated with a respective one of the liquid conduits for producing the electrospray emission of the charged droplets from the outlet of said respective one of the liquid conduits.

5. An electrospray ion source as in claim 4, wherein each liquid conduit is the respective electrode associated with the liquid conduit.

6. An electrospray ion source as in claim 1, further comprising:
- a block though which the plurality of liquid conduits passes,
- wherein each sheath gas conduit comprises a channel in the block, the channel at least partially enclosing a respective one of the liquid conduits.

7. An electrospray ion source as in claim 6, wherein at least two of the channels are angled with respect to one another so that the respective emitted sheath gas flows provide spatial confinement of a portion of the charged droplets emitted from the respective liquid conduit outlets.

8. An electrospray ion source as in claim 1, further comprising at least one additional electrode configured so as to improve uniformity of emission of charged droplets across the plurality of liquid conduit outlets.

9. An electrospray ion source as in claim 8, wherein the at least one additional electrode comprises a plurality of additional electrodes.

10. An electrospray ion source as in claim 1, further comprising at least one heater associated with the plurality of sheath gas conduits so as to heat the sheath gas portions.

11. An electrospray ion source as in claim 1, wherein each sheath gas conduit comprises a cross sectional area associated with the sheath gas flow therein, wherein the plurality of said cross sectional areas are substantially identical to one another.

12. An electrospray ion source as in claim 1, wherein each liquid conduit is configured so as to admit a flow rate of the analyte-bearing liquid portion of between 1 microliter per minute and 1 milliliter per minute.

13. An electrospray ion source for a mass spectrometer comprising:
- a source of an analyte-bearing liquid;
- a source of a sheath gas;
- a plurality of liquid conduits, each liquid conduit configured so as to receive a portion of the analyte-bearing liquid from the source of analyte-bearing liquid;
- at least one electrode for producing electrospray emission of charged droplets from an outlet of each of said liquid conduits under application of an electrical potential to the at least one electrode;

a power supply electrically coupled to the at least one electrode for maintaining the at least one electrode at the electrical potential; and a sheath gas conduit comprising:

an inlet configured to receive the sheath gas from the source of sheath gas; and an outlet configured to emit a sheath gas flow that circumferentially surrounds, in at least two dimensions, a portion of the charged droplets emitted from every one of the plurality of liquid conduit outlets.

14. An electrospray ion source as in claim 13, wherein the sheath gas conduit comprises a groove in a block that at least partially encloses the plurality of liquid conduits.

15. An electrospray ion source as in claim 13, wherein at least a portion of the sheath gas conduit is disposed at angle with respect to the plurality of liquid conduits so that the emitted sheath gas flow provides spatial confinement of a portion of the charged droplets emitted from the plurality of liquid conduit outlets.

16. An electrospray ion source as in claim 13, wherein the sheath gas conduit comprises a tube that at least partially encloses every one of the plurality of liquid conduits.

17. An electrospray ion source as in claim 13, wherein each liquid conduit comprises a capillary.

18. An electrospray ion source as in claim 13, wherein the at least one electrode comprises a plurality of electrodes, each electrode of the plurality of electrodes associated with a respective one of the liquid conduits for producing the electrospray emission of the charged droplets from the outlet of said respective one of the liquid conduits.

19. An electrospray ion source as in claim 18, wherein each liquid conduit is the respective electrode associated with the liquid conduit.

20. An electrospray ion source as in claim 13, further comprising at least one additional electrode configured so as to improve uniformity of emission of charged droplets across the plurality of liquid conduit outlets.

21. An electrospray ion source as in claim 20, wherein the at least one additional electrode comprises a plurality of additional electrodes.

22. An electrospray ion source as in claim 13, further comprising at least one heater associated with sheath gas conduit so as to heat the sheath gas.

23. An electrospray ion source as in claim 13, wherein each liquid conduit is configured so as to admit a flow rate of the analyte-bearing liquid portion of between 1 microliter per minute and 1 milliliter per minute.

24. A method for providing ions to a mass spectrometer, comprising:

providing a source of an analyte-bearing liquid;

providing a source of a sheath gas;

providing a plurality of liquid conduits, each liquid conduit configured so as to receive a portion of the analyte-bearing liquid from the source of analyte-bearing liquid;

providing at least one electrode associated with the plurality of liquid conduits;

providing a plurality of sheath gas conduits, each sheath gas conduit comprising a sheath gas outlet configured to emit a sheath gas flow that circumferentially surrounds, in at least two dimensions, an outlet of a respective one of the liquid conduits;

distributing the analyte-bearing liquid among the plurality of liquid conduits;

distributing the sheath gas among the plurality of sheath gas conduits; and maintaining the at least one electrode at an electrical potential such that charged liquid droplets are emitted from the plurality of liquid conduits.

25. A method for providing ions to a mass spectrometer as in claim 24, wherein the step of providing a plurality of sheath gas conduits comprises providing a plurality of tubes, each tube at least partially enclosing the respective liquid conduit.

26. A method for providing ions to a mass spectrometer as in claim 24, wherein the step of providing a plurality of sheath gas conduits comprises providing a plurality of channels in a block, the block at least partially enclosing the plurality of liquid conduits.

27. A method for providing ions to a mass spectrometer as in claim 24, further comprising providing at least one heater associated with the plurality of sheath gas conduits so as to heat the sheath gas.

28. A method for providing ions to a mass spectrometer as in claim 24, further comprising providing a heated auxiliary gas encompassing said charged liquid droplets.

29. A method for providing ions to a mass spectrometer, comprising:

providing a source of an analyte-bearing liquid;

providing a source of a sheath gas;

providing a plurality of liquid conduits, each liquid conduit configured so as to receive a portion of the analyte-bearing liquid from the source of analyte-bearing liquid and having a respective outlet;

providing at least one electrode associated with the plurality of liquid conduits;

providing a sheath gas conduit comprising a sheath gas outlet configured to emit a sheath gas flow that circumferentially surrounds, in at least two dimensions, the outlets of the plurality of liquid conduit outlets;

distributing the analyte-bearing liquid among the plurality of liquid conduits;

providing the sheath gas to the sheath gas conduit; and maintaining the at least one electrode at an electrical potential such that charged liquid droplets are emitted from the plurality of liquid conduits.

30. A method for providing ions to a mass spectrometer as in claim 29, wherein the step of providing a sheath gas conduit comprises providing a sheath gas conduit that at least partially encloses the plurality of liquid conduits.

31. A method for providing ions to a mass spectrometer as in claim 29, wherein the step of providing a sheath gas conduit comprises providing a groove in a block, the block at least partially enclosing the plurality of liquid conduits.

32. A method for providing ions to a mass spectrometer as in claim 29, further comprising providing at least one heater associated with the sheath gas conduits so as to heat the sheath gas.

33. A method for providing ions to a mass spectrometer as in claim 29, further comprising providing a heated auxiliary gas encompassing said charged liquid droplets.

* * * * *